United States Patent [19]
Tullis

[11] Patent Number: 5,686,720
[45] Date of Patent: Nov. 11, 1997

[54] METHOD AND DEVICE FOR ACHIEVING HIGH CONTRAST SURFACE ILLUMINATION

[75] Inventor: Barclay J. Tullis, Palo Alto, Calif.

[73] Assignee: Hewlett Packard Company, Palo Alto, Calif.

[21] Appl. No.: 627,625

[22] Filed: Apr. 4, 1996

Related U.S. Application Data

[63] Continuation-in-part of Ser. No. 396,826, Mar. 2, 1995, Pat. No. 5,578,813.

[51] Int. Cl.⁶ .................................................. H01J 40/14
[52] U.S. Cl. .................. 250/208.1; 250/557; 358/473; 235/472
[58] Field of Search .......................... 250/208.1, 234, 250/235, 556, 557, 559.22, 559.32, 559.44, 306, 307, 559.4; 356/376; 235/472, 462; 382/313, 316; 358/473–475, 488, 493, 494; 128/665, 663.01

[56] References Cited

U.S. PATENT DOCUMENTS

| | | | |
|---|---|---|---|
| 4,731,668 | 3/1988 | Satomura et al. | 358/473 |
| 5,149,980 | 9/1992 | Ertel et al. | 250/559.32 |
| 5,434,680 | 7/1995 | Noda et al. | 358/473 |

*Primary Examiner*—Que Le

[57] ABSTRACT

A method and device for acquiring data related to topography of a medium includes projecting light, allowably from more than one direction, onto the surface of the medium at an angle of less than sixteen degrees relative to the surface and imaging the surface. For example, the imaging sensor may be an array of sensor elements that is used to determine navigation of a hand-held scanner along an original. By introducing light at an angle of less than sixteen degrees, surface irregularities cast shadows that form a high contrast illumination pattern along the surface of the medium. The navigation sensor detects multi-element variations of intensity of scattered light from the surface with respect to positions along the surface, so that the Nyquist criteria are adequately satisfied. Typically, the light is collimated incoherent light, but this is not critical. The illumination angle can be established by using a prism. The prism may have an antireflective thin film coating on one or more prism faces. The employment of a prism provides a number of advantages, such as use of a transparent surface in contact with the media and raising the illumination source(s) away from the media.

23 Claims, 6 Drawing Sheets

METHOD AND DEVICE FOR ACHIEVING HIGH CONTRAST SURFACE ILLUMINATION

CROSS REFERENCE TO RELATED PATENT APPLICATION

This application is a continuation-in-part application of U.S. Ser. No. 08/396,826 filed Mar. 2, 1995, now U.S. Pat. No. 5,578,813.

TECHNICAL FIELD

The present invention relates generally to devices and methods for acquiring data related to topography of a medium and more specifically to illumination sources and optics for high-speed acquisition of position encoding and/or image-reproducing data.

BACKGROUND ART

An accurate determination of relative movement between a device and a specific surface is important in a variety of applications. For example, the continuous movement of a sheet of paper through a photocopier may be monitored in order to allow precise identification of the position of the sheet along a paper path. U.S. Pat. No. 5,149,980 to Ertel et al., which is assigned to the assignee of the present invention, describes a method and apparatus for using a cross-correlation function to determine the distance that a sheet of paper has moved in a given direction through a photocopier, printer or scanner.

In the preferred embodiment of the Ertel et al. method, a linear array of light sensors is used to receive and sense light reflected from the sheet of paper. The patent notes that for practical applications, it is necessary to compromise between directing a light source so as to gain the benefits associated with normal light incidence and directing the light source to gain the benefits associated with grazing incidence. At close to normal incidence, light reflection is highest, but the light tends to "wash out" the surface texture of the paper, so that the surface texture cannot be used to determine the distance of sheet movement. At the other extreme, light directed at a grazing incidence will produce exaggerated shadowing of the surface texture, but the reflection perpendicular to the plane of the paper will be minimal, i.e., the light that reaches the light sensors will be minimal. Consequently, the compromise is described as necessary for practical applications, and the selection of the angle includes consideration of the proximity of the lens barrel to the paper and any other light path obstructions.

In the use of the patented method for determining the distance a sheet of paper has moved in a given direction, paper fibers are viewed. If the sensor array is a one-dimensional array, the patent describes the imaging device as a CCD array of 256 photo sites, each having a square configuration. A single photo site is 13 µm×13 µm, with the total length of the array being 3.328 mm. A one-fourth power optical de-magnification is used, so that the CCD senses a section of paper that is 13.312 mm long. The field of view of an individual site is 52 µm×52 µm. A typical cross section of a paper fiber is approximately 25 µm. Significant image blurring is then used to prevent the higher spatial frequencies from causing signal aliasing.

While prior art techniques operate well for the applications for which they are designed, higher speed and/or portable applications require significant advances in energy efficiency, signal-to-noise ratios (SNR), position sensing precision and accuracy and compactness. One example is a hand-held portable document scanner that can acquire and store a faithful representation of an image of a scanned original. Typically, the captured image provided by the scanning device is a pixel data array that is stored in memory in a digital format. A distortion-free image requires a faithful mapping of the image to the pixel data array. Scanners often include at least one means for imposing a mechanical constraint during the image capture process, so as to maximize the likelihood of faithful mapping. However, if a scanning device is to be used without such mechanical constraint, faithful reproduction becomes more difficult and requires sensing two-dimensional positions and rotations. The issues of efficiency, SNR and accuracy are of equal concern in printing applications.

What is needed is a compact and energy efficient method and device for acquiring accurate navigation and/or print-image information in a low-cost manner that allows relatively quick movement across a medium of interest. What is also needed is a device and method that acquires navigation information sufficient to accommodate curvilinear movement of the device during an operation that requires the device to be scanned.

SUMMARY OF THE INVENTION

The invention is an imaging method and device in which at least one illumination source directs radiation at a grazing angle of less than sixteen degrees relative to a surface of interest to provide surface areas of high brightness and surface areas of low brightness. By directing the radiation at an angle of less than sixteen degrees from a surface, raised surface irregularities cast shadows that provide a high-contrast illumination pattern within a region of interest on the surface. In the preferred embodiment, grazing illumination strikes the region of interest from more than one direction relative to the normal of the surface. Where high scanning speeds are required, simultaneous grazing angle illumination from multiple directions raises signal level and enhances detectability of the illumination pattern. If relative movement is initiated between first the surface of interest and second an array of sensor elements that are fixed relative to the illumination source, the high intensity features and low intensity features can be tracked in order to provide either or both of position encoding information and image information for forming an image of the surface of interest. Thus, the image features of the surface define a unique pattern of surface topography, and the pattern is associated with the specific region of the surface being sensed. Moreover, the pattern is more dependent upon larger surface features than individual fibers.

The preferred embodiment of detecting illumination features, where displacement or motion is involved, must satisfy a cross-sectional 2:1 ratio of field-of-view size to feature size. Nyquist criteria dictate that the dimensions of shadows cast by surface irregularities be at least twice as large as the field-of-view of an individual sensor element. For use of the method and device in reproducing an image of the surface of a sheet of paper, the high intensity and low intensity features may be a result of surface roughness formed by a screen in the paper manufacturing process. While the surface roughness is not typically visible to the human eye, projecting the light at less than sixteen degrees relative to the paper causes such surface roughness to cast shadows that provide an illumination pattern having sufficient depth of intensity modulation for tracking features that satisfy the said cross section requirement. The features rendered with grazing light are generally larger than paper fibers and thereby enable higher scanning speeds, as will be explained below.

There are major advantages to illuminating surface features at angles of less than sixteen degrees. Directionality of lighting or collimation is then required only in the incidence plane parallel to the surface normal, so that there is a greatly relaxed requirement for collimation in planes orthogonal to such an incidence plane. As a consequence, multiple illumination sources can be utilized, or a source extending parallel to the surface and thereby able to define a large illumination area, can be utilized while still meeting the required degree of collimation within the planes of incidence for achieving high contrasts. Another significant advantage of sub-sixteen degree illumination is that by creating larger contrast features, sensor arrays with a fixed number of elements can have larger fields of view without violating the Nyquist criterion, thereby permitting capture of more signal. This also increases signal strength by permitting longer sample integration.

In the embodiment in which an image of the surface of interest is to be formed, the surface irregularities may be print on the surface of a medium, such as a sheet of paper. The sensor array and the illumination source may be secured to a hand-manipulable housing, such as a hand-held scanner. As the housing is moved relative to the surface of the medium, signals from the sensor array track displacement of surface irregularities relative to the array. For example, successive images of the illumination pattern on the medium surface may be correlated to provide navigation information regarding the path that the housing is moved along the medium.

The radiation from the illumination source will be referred to herein as "light," but the radiation may be electromagnetic radiation outside of the visible spectrum. While the source of illumination may be a source of coherent light, preferably incoherent light is used.

There are a variety of structural variations for implementation of the grazing illumination and a variety of applications, as will be set forth in greater detail below. With regard to illumination sources, the grazing illumination may be: (1) from a single source; (2) from one or more sources, each in a different plane of incidence orthogonal to the surface but all directed onto a single surface region in order to increase apparent surface brightness without a corresponding significant loss of contrast; or (3) from more than one source onto separate portions of the surface region in order to provide cross-structured grazing illumination that improves symmetry within applications in which correlation is a factor. With regard to two of the possibilities for arrangement of optical elements, light energy may be directed at the surface at the desired angle and then collected, both by means of either: (1) a prism having a media-contacting window; or (2) a one-piece molded optic that deflects normally incident illumination into sub-sixteen degree illumination via a total-internal reflection mirror and that includes a recessed media window. Possible applications of the invention include medical imaging, original image reproduction and acquisition of surface navigation information.

In one implementation, collimated light is directed at the medium by means of a prism. There are a number of advantages to using a prism to define the paths from the illumination source to the medium and from the medium to the sensor array. One advantage is that the angle of illumination toward the surface is larger within the prism than the eventual sub-sixteen degree or grazing angle upon exit from the prism for illumination of the surface of the medium. This renders it easier to precisely translate a small cross sectional beam to strike a desired target region of a surface. A second advantage is that the higher index of the prism means that less light will be lost through divergence in traveling the distance through the prism. Two disadvantages of using a prism are that light into the prism must be much better collimated and that the angle of incidence into the prism must be much more tightly controlled.

Directing and collecting light by means of a prism provides a practical embodiment for grazing angle illumination. A prism allows use of multiple illumination sources, as may be required to distinguish a number of colors or to increase the contrast.

In one embodiment, the light projection at an angle of less than sixteen degrees is accompanied or replaced by optics for allowing normally incident light projection, so that a user may select between the two forms of projection, depending upon the likelihood that the frequency of raised surface irregularities will allow accurate tracking of navigation.

A thin film dielectric antireflection coating may be used on the distal surface of the prism in order to better couple incident illumination near the critical angle of total internal reflection, thereby reducing beam power loss by reflection within the prism and increasing transmission to the surface of the scanned medium.

A diffuser may be used to help meet the Nyquist criteria of the sensor array. The diffuser permits the higher spatial frequencies within the surface-texture images to be blurred or "rolled off" without sacrificing any depth of field or signal power. A best embodiment of this diffuser is a computer generated diffraction element placed just before the imaging array such that incident light directed toward a single sensor element is diffracted partially to nearest neighbor elements.

Rather than a prism, a one-piece molded optic may be used to deflect normally incident illumination into the desired low-angle illumination via a total-internal reflection (TIR) mirror. Moreover, the optic preferably includes a recessed, out-of-focus, dust-protecting medium window. Such a window provides a contact optic that does not in fact contact the medium at the target area itself. This reduces the susceptibility of the device and method to adverse effects of imaging dust, dirt, and scratches and enables sub-sixteen degree illumination to be introduced below the window in order to avoid any complications associated with passing the low-angle illumination through a glass-to-air interface that is parallel to the surface of interest.

As previously noted, collimation and use of a prism are not critical to the invention. In fact, a low-spatial frequency texture of a single surface region may be illuminated at sub-sixteen degree angles from more than one direction without a prism to achieve increases in apparent surface brightness without comparable losses in contrast. If areas of an illuminated surface region are sufficiently low relative to surrounding areas, such that these low-lying areas will not be illuminated by grazing angle light regardless of its direction, preferably the additional illumination is introduced from more than one direction in order to increase the surface brightness at the high-lying areas without a significant loss of shadows at the low-lying areas.

In another embodiment, the region of interest is divided with respect to directions of illumination. As an example, a first grazing angle illumination is oriented generally along the direction of rows of sensor elements in a sensor array, while a second grazing angle illumination is oriented generally along the direction of columns in the array. If each illuminated region is 32×32 pixels, the sensor array may be 32×64 elements, although there may be some intentional or unintentional overlapping of the two illuminations. By dividing the region of interest in this manner, any preferential orientation of image contrasts in the media image is at least partially offset, whether caused by media anisotropics or by the illumination directionality.

An advantage of the method and device is that the projection of light onto the surface of interest at an angle of less than sixteen degrees relative to the surface provides a surface illumination pattern that is rich in contrast. By tracking only those features of the illumination pattern that satisfy Nyquist criterion on the cross sectional relationship with the field of view of the sensor elements and/or by using a prism or similar optics to first direct and then collect the light, a practical embodiment of grazing angle illumination and detection is achieved. That is, the need to establish a compromise between grazing angle and near perpendicular illumination, as taught by the above-identified patent to Ertel et al., is overcome.

The direction at which light is projected relative to a direction of travel of the sensor array along the surface of interest is one major factor in the development of a sufficiently high signal-to-noise ratio to provide reliable position-encoding or image-reproduction information. A second important factor is removing low spatial frequency variations as might be caused by unavoidable non-uniformities in illumination across the full sensor array field of view. Preferably, the processing circuitry includes DC removal circuits that transform the original imaging of the illumination pattern into an image of local differences, so that the low spatial frequencies are removed, but these are preferential to the directions that can be locally differenced, i.e. preferential to rows or to columns or to principal diagonals. The third factor involves the number of rows and the number of columns of sensor elements in the array. The greater the number of elements in one direction, the greater the renderable contrast in accumulation of data with respect to that direction. Thus, there is a correlation between the number of elements and the signal-to-noise ratio upon movement in a particular direction. By accounting for each of the above three important factors, the strengths of one can be used to offset the weaknesses of one or both of the others in order to allow adequate correlation signals for motions in any direction over the surface.

BEST MODE FOR CARRYING OUT THE INVENTION

The invention may be utilized in any of a variety of applications, including medical-related and computer-related applications. For the purpose of understanding, the method will be described with reference to computer scanners.

Figure 1:
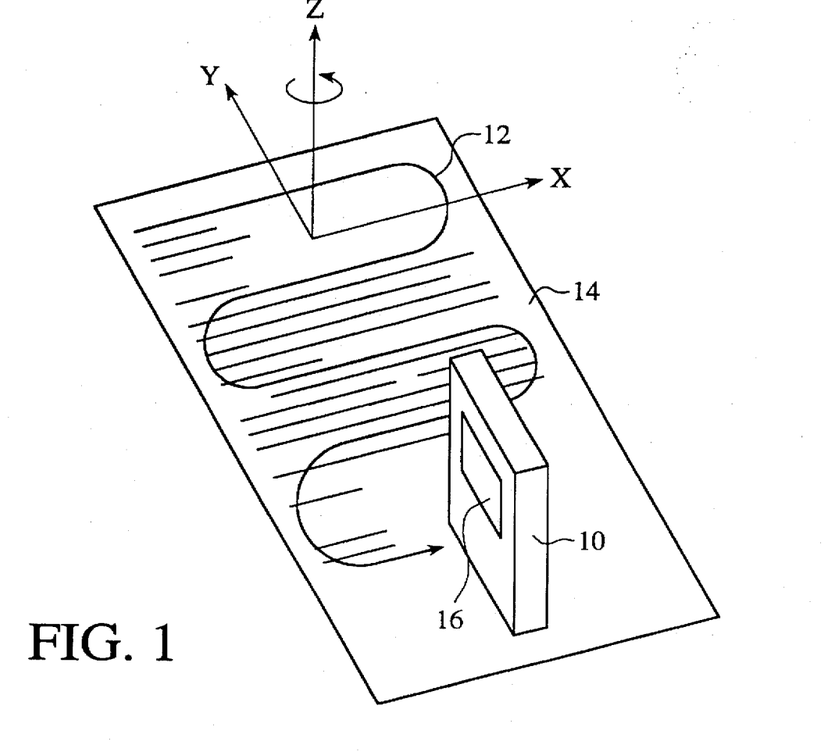
FIG. 1 is a perspective view of a hand-held scanning device following a meandering path on an original in accordance with the invention.

With reference to FIG. 1, a portable, hand-held scanning device 10 is shown as having followed a meandering path 12 along an original 14. The original may be a piece of paper, an overhead transparency film, or any other image-bearing surface upon which illumination of the original at an angle of less than sixteen degrees will generate sufficient contrast to provide position information during navigation along the meandering path. Typically, the low intensity and high intensity features of the resulting illumination pattern are tracked and the position information is used to rectify image data, but other embodiments will be described. The scanning device is preferably self-contained and battery powered, but may include a connection to an external source of power or to data ports of computers or networks.

The scanning device 10 of FIG. 1 may include an image display 16. The display may provide almost immediate viewing of a captured image. However, a display is not essential to the use of the scanning device.

The scanning device 10 allows three degrees of freedom, with two being in translation and one in rotation. The first degree is the side-to-side movement (X axis movement) along the original 14. The second degree of freedom is movement upwardly and downwardly along the original (Y axis movement). The third degree of freedom is the ability to operate the device with rotational misalignment of a linear array of image sensor elements relative to an edge of the original 14 (θ axis movement). That is, the linear array of imaging elements may have an angle of attack that is not perpendicular to the direction of device translation.

Figure 2:
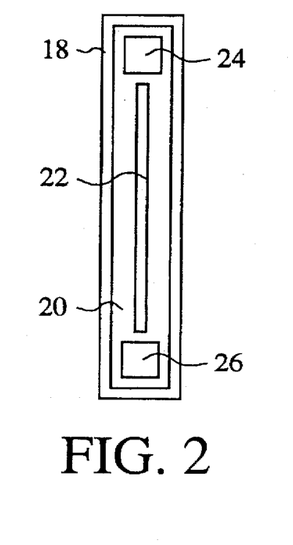
FIG. 2 is a surface plan view of imaging and navigation sensors of the scanning device of FIG. 1.
Figure 3:
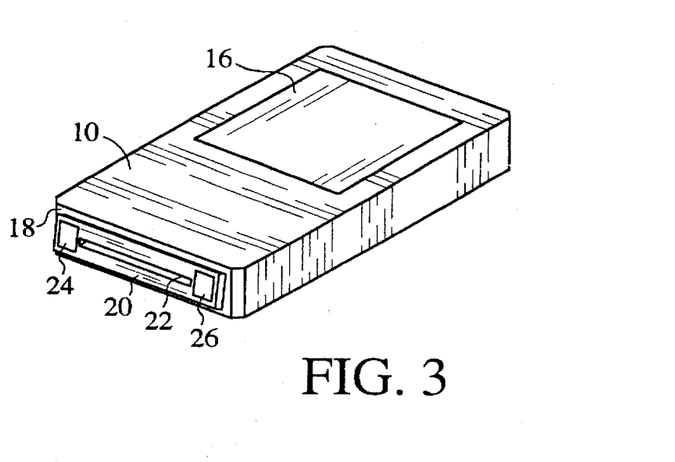
FIG. 3 is a perspective view of the scanning device of FIG. 1, shown with the imaging and navigation sensors exposed.

Referring now to FIGS. 1–3, the forward side 18 of the scanning device 10 may include a pivoting member 20 that aids in maintaining proper contact between the original 14 and an imaging sensor 22. Navigation sensors 24 and 26 are located at the opposed ends of the imaging sensor. Because the navigation sensors are mounted on the pivoting member, the navigation sensors are in a fixed location relative to the imaging sensor.

For reasons of physical compactness, the imaging sensor array 22 is preferably a contact image device, but for applications in which compactness is less of a concern or a smaller image is desired, sensors employing projection optics may be employed, with magnification less than unity. In such applications, the elements of the imaging sensor 22 should be smaller and more closely packed together. Contact imaging devices typically employ lenses sold under the trademark SELFOC, which is a federally registered mark of Nippon Sheet Glass Company Limited. Less conventionally, contact imaging can be obtained using interleaved array elements of sources and proximal sensors, without any imaging lenses. Conventional imaging sensors for scanning applications may be used. The imaging sensor may be part of a unit that also includes an illumination source, illumination optics, and image transfer optics.

The imaging sensor 22 is shown as a linear array of discrete optically sensitive elements. The spacing of the elements plays a role in determining the spatial resolution of the scanner 10. For example, a linear array having a length of 101.6 mm requires 1200 sensor elements to achieve a resolution of 300 dpi. The sensor may be a charged coupled device (CCD), an amorphous silicon photodiode array, or any other type of linear array sensor known in the art.

A key consideration in the design of the imaging sensor unit is speed. The imaging sensor 22 preferably is able to image each pixel at approximately 10K samples per second. Linear imaging arrays generally produce a serial data stream, wherein pixel values, i.e. charges, are placed into a shift register and then shifted out. Achieving the desired speed requires either very fast serial transfer rates out of the entire image array or multiple taps, so that pixel values can be shifted through fewer cells. This introduces parallelism, which is advantageous for digital processing.

Another consequence of the speed requirement is that the products of pixel areas, at the surface of the original, and their solid angles of emitted light collected and conveyed to each array element should be sufficiently large to produce a detectable signal in integration times on the order of 100 microseconds. An enhancement option is to add an optical element to the sensor to increase the effective fraction of sensor pitch for which each sensing element is responsive. Since there is typically unused area in the array matrix, such light collection optics increase sensitivity.

In FIG. 1, the meandering path 12 is shown as having four and a fraction swaths, i.e. side-to-side passes across the original 14. A useful imaging sensor 22 for most opportunistic applications has a length within the range of 25.4 mm and 101.6 mm. If the sensor 22 has a length of 63.5 mm, an A4 paper can be scanned in four or five swaths. The swaths should include regions of overlap, so that a stitching process can be used to produce a faithful reproduction of the original image.

The scanning device 10 typically includes at least one navigation sensor 24 or 26. In the preferred embodiment, the device includes a pair of navigation sensors, with the sensors being at opposite ends of the imaging sensor 22. While a one-dimensional array of optoelectronic elements may be used, in the preferred embodiment, each navigation sensor is a two-dimensional array of elements. The navigation sensors 24 and 26 are used to track movement of the scanning device 10 relative to the original 14.

The navigation sensors 24 and 26 of FIG. 2 effectively observe a moving image of the original 14 and produce an indication of the displacement in two planar dimensions between successive observations. As will be explained more fully below, pixel values from the navigation sensors are operated upon by processing elements to determine proper mapping of image data from the imaging sensor 22. The processing elements operate on a particular pixel and its nearest neighbors to produce an array of correlation values at each pixel location. The correlation values are based upon comparisons between a current image of the surface structure and a stored image representing a known position of inherent structural features, wherein the stored image serves as a position reference. However, operations other than the correlation process may be employed in manipulating the input image data to form the output image.

Figure 4:
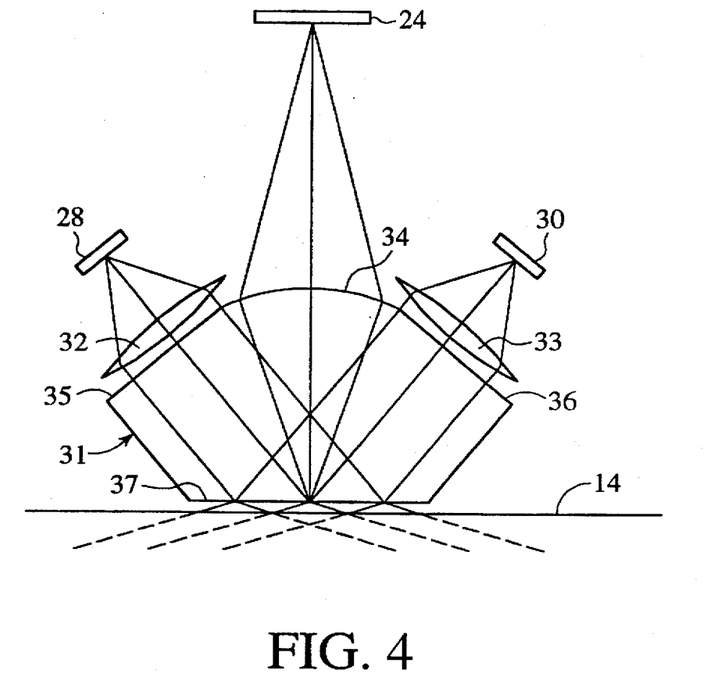
FIG. 4 is a schematic representation of a prism and grazing angle illumination from more than one light source.

Referring now to FIG. 4, navigation sensor 24 is shown as being operatively associated with illumination optics. If the original 14 is a paper product for which surface irregularities are to be detected by the navigation sensor 24, the introduction of light at a grazing angle causes the surface irregularities to cast shadows, thereby creating an illumination pattern that is rich in contrast between brightly illuminated raised surface features and darker shadowed areas between the raised surface features. While not essential, one or more light emitting diodes (LEDs) 28 and 30 may be used as illumination sources. The grazing angle, which is the complement of the angle of incidence, is in the range of zero degrees and fifteen degrees, depending upon the properties of the original 14. The optics may comprise a single element or a combination of lenses, filters and/or holographic or diffractive elements to accomplish suitable collimated and generally uniform illumination of the target surface. The wavelength of the light emitted by the source 28 and 30 should be selected to enhance the spatial frequency information available for navigation. Fixed pattern noise in the illumination field should be minimized. The output of source 28 may require adjustment to accommodate wide dynamic ranges of reflectivity of the original as the scanning device proceeds over printed materials with absorbing or reflecting inks or other marking agents.

The magnification or demagnification of navigation imaging optics should be constant over the field-of-view of the two-dimensional sensor array 24 which detects the imaged light from the surface. In many applications, the modulation transfer functions, i.e. the amplitude measure of optical frequency response, of the navigation optics must be such as to provide attenuation before the Nyquist frequency that is determined by the pitch of the sensor elements of the navigation sensor and by the magnification of the optical elements. The optical elements should also be designed to prevent background illumination and stray light from creating noise. Note that a wavefront splitting beam-splitter could also be used.

Illuminating a target region of an original 14 at an angle of less than sixteen degrees works well for applications in which the surface of the original has a high degree of unevenness. For example, the introduction of light from the source 28 at a grazing angle provides a high signal-to-noise ratio of data related to surface features when the original is stationery, cardboard, fabric, or human skin. Grazing angles of illumination generate longer shadows and more apparent contrast than will illumination projected at an angle of sixteen degrees or greater relative to the surface of the original. That is, if the surface of the original is not flat, smooth and glossy, the AC signal level is greatly enhanced by use of grazing angles of illumination. On the other hand, the DC signal level increases as the illumination angle approaches the normal to the original.

FIG. 4 illustrates an embodiment of achieving a grazing angle of illumination by means of a prism 31. The prism may be made of common optical crown glass, such as the type sold by Schott under the model number BK-7 glass for which n=1.5185. Two illumination sources 28 and 30 project light that is collected by lenses 32 and 33, respectively, and collimated before entering the prism 31. The light is redirected upon exiting the prism to strike a surface of the original at a grazing angle of less than sixteen degrees to the surface of the original. Light scattered from a target zone of the surface is collected by an upper lens surface 34 of the prism and is directed at the navigation sensor 24. The navigation sensor may be clocked electronically to provide successive frames of the illumination pattern at the surface. The successive frames may be correlated in a manner to be described below, but correlation is not critical to the invention.

In an acceptable embodiment of the invention, the prism 31 has faces 35 and 36 whose normals are sloped by approximately 40.7 degrees from the normal of the surface of the original 14. Such a slope permits the light emitted from the illumination sources 28 and 30 to be normally incident onto the prism faces, so that the central rays are unlikely to undergo any significant refraction upon entering the prism. Thus, central rays of light can be made to strike the distal face 37 of the prism 31 at an angle of 40.7 degrees, slightly less than the angle of total internal reflection for BK-7 glass. The light transmitted from the distal face 37 will be at a grazing angle to the surface of the original. For BK-7 glass and an angle of 40.7 degrees, the incidence angle of light striking a target zone of the original will be approximately 82 degrees with respect to the normal of the surface, i.e. a grazing angle of eight degrees with respect to the plane of the surface. In practice, the illumination beams should be positioned to be centered around a target zone of the surface. The target zone remains stationary relative to the prism 31, but moves relative to the surface as the scanner is relocated.

In the embodiment of FIG. 4, the lens surface 34 of the prism 31 is shaped with rotational symmetry about an optical axis defined by the center of the navigation array 24 and the center of the target zone of the surface of the original 14. While not shown, the lens surface 34, which exhibits optical power, may be replaced with a planar segment, and a lens or lens system separate from the prism geometry could be used to image the target zone onto the navigation sensor 24. In yet another alternative embodiment, the optical power of the collimation lenses 32 and 33 could be achieved by properly shaping the prism faces 35 and 36.

Where the navigation determination is to be acquired via image correlation, accuracy and precision of the determination may be enhanced by improving the uniformity of illumination over the imaged target zone of the surface of the original 14. Illumination uniformity may be improved by employing techniques of energy remapping, such as by suitably reshaping two or more of the optical surfaces in the illumination path of each of the sources 28 and 30. As an example, the surfaces of the collimation lenses 32 and 33 and/or the prism faces 35 and 36 may be reshaped. If there is a refracting surface in the construction of the illumination sources themselves, these surfaces may also be employed in the energy remapping. Such remapping to accomplish uniform power across beam cross sections is known art, but the flexibility in incorporating part of the energy remapping optics into the prism design is considered novel.

Optionally, the invention may incorporate a diffusing function onto the lens surface 34 of the prism 31. A separate or alternative diffusing element may also be used between the prism and the navigation sensor 24. The purpose of the diffusion is to transform the signal power into spatial frequencies either near to or lower than the Nyquist limiting spatial frequency (which is related to the pitch of the sensor elements of the array 24). That is, a diffuser would provide a roll-off of spatial frequencies which could otherwise cause aliasing in the correlation operation and at the same time boost the signal energy of lower spatial frequencies.

The use of a grazing angle of illumination to achieve a high contrast illumination pattern along the target zone of the original 14 is not limited to acquiring navigation data. Projection at a grazing angle will cause raised print on a page to cast shadows, so that the invention may be used to form an image of print on a page.

There are a number of advantages to employing a prism 31 to provide grazing angle illumination from a source 28 and 30 of light. Firstly, as shown in FIG. 4, multiple sources of illumination may be used simultaneously without as much loss in contrast. Also, the prism lowers the loss factor due to geometrical projection of the illumination beam and the consequent surface brightness at high points of the surface that are in intimate contact with the prism face. Without the prism, the loss factor is cos (90°−8°)=0.139 at eight degrees grazing incidence. However, with use of the prism having an index of refraction of 1.5185, the equivalent loss factors become cos (90°−40.7°)=0.652. Consequently, the improvement in this factor with use of a prism at eight degrees over no prism is 0.652/0.139=4.69.

Another advantage of the use of the prism is that divergence of the incident beam within the prism is reduced. Moreover, there no longer is a strong need for collimation in any plane perpendicular to the plane of incidence, where the plane of incidence lies parallel to the surface normal. Thus, a number of illumination sources may be arranged around the normal viewing axis, yielding improvements in the illumination irradiance by the same multiple as the number of sources or consequent increase in total source area.

Yet another advantage to using a prism 31 in the optical detection path is that it provides an opportunity to use the faces of the prism to mount navigation optics without significantly widening the overall package. A prism may also provide a significant reduction in the tolerance required to translationally position the illumination at the target zone of the original 14, since the beam cross section which projects onto the target is larger with the prism than without it. The reduction in the tolerance using a prism is inverse to the ratio of the cosine of the incidence angle before leaving the prism to that after leaving the prism. Controlling the beam angle to aim the incoming beam of illumination to strike a region of interest of an original 14 at the desired grazing angle however becomes more demanding with the use of a prism. Another disadvantage of using a prism in the above manner, wherein the illumination is injected into the prism along the normal to the input face, is that the input beam must be collimated better within the plane of incidence as well as aimed more precisely in angle. These two effects can be reduced by embedding the source within the prism medium or reduced or eliminated by increasing the slope of the first prism surface and increasing the angle of incidence as shown in FIG. 5.

Figure 5:
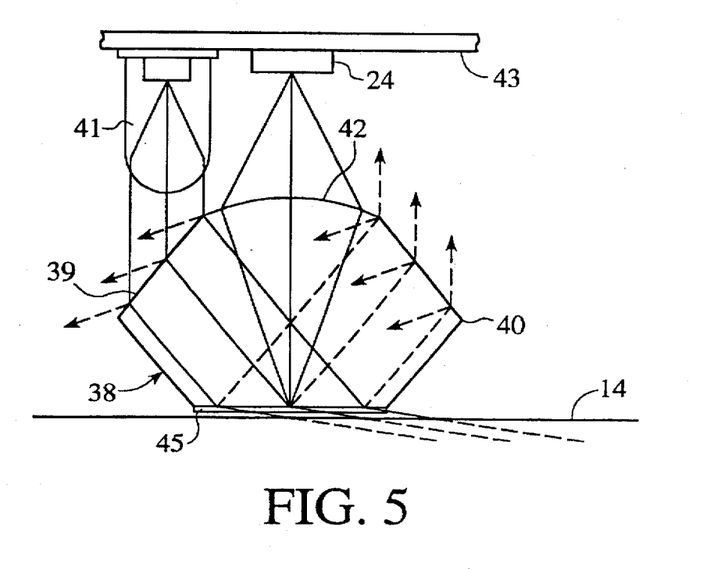
FIG. 5 is a schematic representation of grazing angle illumination using a light source mounting adjacent to a navigation sensor, with an antireflection coating on a prism.

Referring now to FIG. 5, a prism 38 is shown as having sloped prism faces 39 and 40 to allow incident illumination from a source 41 to be initially parallel to the normal of the surface of the original 14. The angles of the prism faces 39 and 40 are approximately 81.43 degrees, again assuming that the index of refraction of the prism material is 1.5185. This angle is also the angle of incidence of light that strikes the surface after being emitted from a prism.

The embodiment of FIG. 5 permits the incidence angle at the distal face of the prism 38 to be the same 40.7 degrees as described with reference to FIG. 4. Consequently, the prism may have a lens surface 42 identical to that of the one described with reference to FIG. 4. That is, the lens surface 42 collects light from a target zone of the original 14 and images the target zone onto a navigation sensor 24. Both the navigation sensor and the illumination source 41 are shown as being mounted to a contact surface 43 of a scanning device.

The distal prism face, i.e. the surface of the prism 38 that is closest and parallel to the surface of the original 14, should be kept in close proximity to the original in order that the target zone is kept in focus at the array 24 and in order that the light emerging from the prism fully illuminates the target zone. The width of the illumination beam from the source 41 is designed to be sufficiently broad that the target zone remains fully illuminated even if there is some separation between the prism and the original.

A concern that arises with the use of the prism 38 relates to reflection losses. Reflection losses can be significant, especially for polarization perpendicular to the plane of incidence. The prism 38 of FIG. 5 includes an antireflective coating 45 in order to improve transmittance and reduce reflection losses. While not shown, preferably the various faces of the prism include the antireflective coating. Some of the potential reflection losses are illustrated by dashed lines in FIG. 5. In comparison, the reflection from the distal face 37 in FIG. 4 will be partially redirected by reflection from the prism faces 35 and 36 to combine with the original beams in being directed at the distal face 37, and thus will not become a source of pattern noise.

The antireflective coating 45 may be formed using known thin-film multilayer dielectric coating techniques. For example, a two layer V-coat with the appropriate choice of index materials and thickness may be applied. Without an antireflective coating at the distal face, the reflections of the parallel and perpendicular components of polarization at the incidence angle of 40.7 degrees for an index of refraction of 1.5185 will be approximately 36% and 65%, respectively. The two layer V-coat having the appropriate choice of index materials and thickness reduces either one of these reflections to below 1% and reduces the other reflection to below a few percentage points.

The illumination source 41 may be a source of incoherent light, but this is not critical. Incandescent lamps, light emitting diodes, laser diodes and laser diode arrays may be utilized. For a hand-held scanner, the use of a light emitting diode is preferred, since it provides reliability and compactness. Coherent sources are acceptable, but may cause problems by producing speckle. It is possible to cast a light emitting die directly into the prism 38, in which case the illumination source could be positioned very near the target zone, with reflective cups and/or diffraction "lenses" being configured to obtain the desired collimation.

The prism 38 may be formed of any of a variety of materials. Molded glass, ground glass, polished glass and molded or cast plastic are suitable materials.

In comparing FIGS. 4 and 5, a single illumination source 41 may be used to provide the grazing illumination of the original, or a number of sources 28 and 30 may be used. In some applications, the multi-directional "floodlighting" in FIG. 4 effectively increases the apparent surface brightness without a corresponding loss in contrast. For example, if the texture of the original 14 defines a raised net-like pattern, the low-lying areas of the illuminated region may be sufficiently low so as not to intercept rays regardless of the direction from which the grazing illumination is originated. In such a case, the multi-source embodiment of FIG. 4 is preferred. By providing more than one source of illumination, the high-lying areas of the illuminated region scatter a greater intensity of light, but the low-lying areas remain within shadows. Furthermore, if the illumination remains at an angle of incidence of less than sixteen degrees, the light need not be collimated in order to obtain sufficient contrast in an image of the target region.

Figure 6:
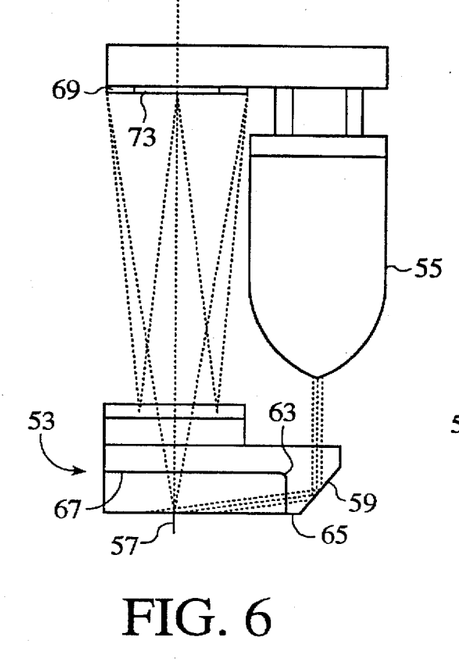
FIG. 6 is a side view of an embodiment that utilizes a one-piece molded optical element to achieve the grazing angle illumination.
Figure 7:
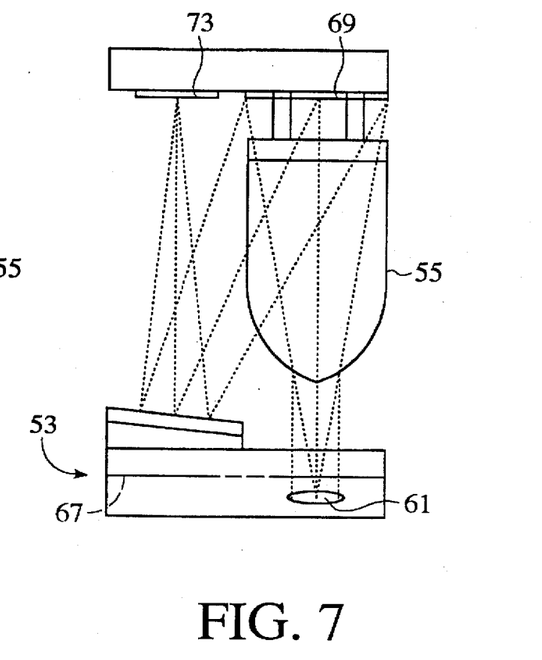
FIG. 7 is a front view of the embodiment of FIG. 6.

Referring now to FIGS. 6 and 7, a one-piece molded optic 53 is provided in order to deflect normally incident illumination from a source 55 into sub-sixteen degree illumination at a target that is represented by line 57. The optic deflects the illumination at a surface 59 that functions as a total-internal-reflection (TIR) mirror. The surface 59 is near 49 degrees relative to the illumination from the source 55. The source may be an LED with a single lens and one or several square die, or may be an LED having a single rectangular die. The LED lens may be refracting or diffracting.

The light from the source 55 is reflected at a region 61 of the TIR mirror 59. The reflected light energy passes through an optic-to-air interface surface 63 prior to reaching the target region 57 of the surface of interest. Consequently, the contact surface 65 of the optic 53 is separated from the target region that is illuminated. Reflection from the target region enters the optic 53 at a recessed surface 67. The reflected light energy passes through the optic to strike an off-axis elliptical mirror or reflecting diffractive lens 69. From the mirror or diffractor 69, the light energy is directed to a flat mirror 71 that redirects the light energy to a two-dimensional array of sensor elements 73. Consequently, the reflected light follows a folded path from the target region 57 to the sensor array 73.

The recessed surface 67 that is out of contact with the surface of interest is associated with a number of advantages. The optic 53 may be considered to have a recessed, out-of-focus, dust-protecting, media window. The window acts to keep dust, dirt, and other foreign matter from entering the interior of the unit. Moreover, the window is removed from the image plane (i.e., the plane of the surface of interest) to reduce the susceptibility of the surface 67 to scratches and dust that would be imaged by the sensor array 73. The recessed window also enables the sub-sixteen degree illumination to be introduced below the level of the surface 67, thereby avoiding any complications associated with introducing grazing light through a glass-to-air interface immediately adjacent to the surface of interest. Instead, the illumination is passed through a sidewall window surface 63 that forms an edge of the recessed window.

Figure 8:
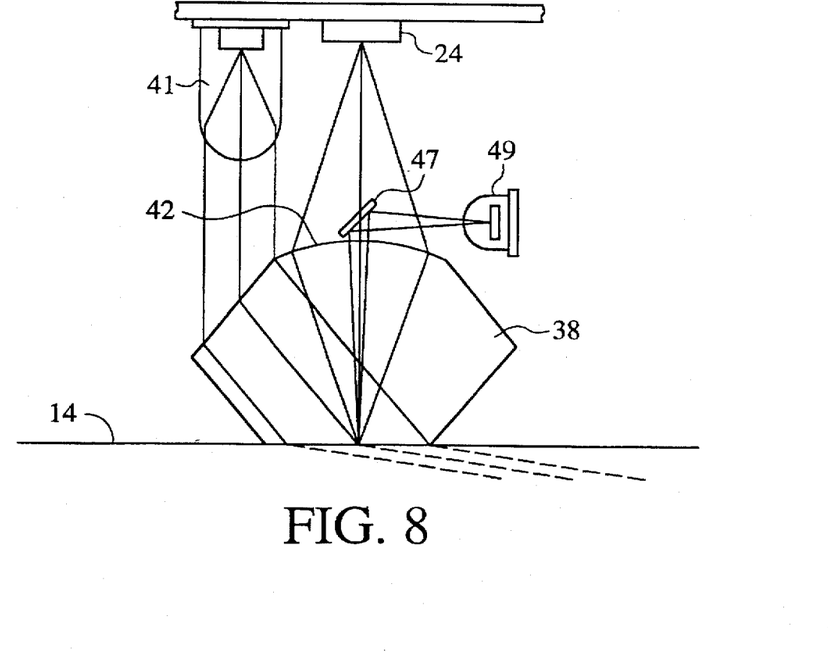
FIG. 8 is a schematic representation of an embodiment using a switchable combination of grazing angle illumination and normal incidence illumination.

Referring now to FIG. 8, normal incidence illumination is shown as being provided as a selectable alternative to the grazing angle illumination of FIG. 5. An illumination source 49 directs light to a reflective element 47 that is centered on the optical axis from a navigation sensor 24 to a target zone of the original 14. The light reflected by the optical element 47 provides illumination of the target zone at generally normal incidence to the surface. Note that the marginal rays of the illumination beam at the 45-degree optical element 47 do not subtend as large an angle from the target zone as does the lens surface 42 itself. This is to permit only those scattered rays that lie more than five degrees outside the marginal incident rays to pass beyond the 45-degree optical element and be received at the navigation sensor 24.

The use of incoherent light at a normal angle of incidence may be preferred in applications in which position or image data are to be acquired from originals such as photographs, glossy magazine pages, and overhead transparency films. While the original may not have sufficient surface roughness to reliably determine navigation along the original by means of tracking shadows and highly reflective raised surface features, the original may exhibit rich texture when viewed five degrees or slightly more away from the direction of reflection, since light scattering from inhomogeneities in refractive index in the original 14 or from defects in surface coatings or films will provide the required basis for determining navigation.

Coherent illumination may also be introduced at normal incidence in order to permit speckle-based navigation. Relative motion between a scanning device and an original may be tracked by monitoring motion of speckle relative to one or more navigation sensors 24. If coherent illumination is used without using imaging optics, then by selecting a small area of illumination and by having a relatively large separation between the surface of the original and the navigation sensor, the resulting predominant speckle cell sizes with coherent illumination can be sufficiently large to satisfy Nyquist sampling criterion.

The use of a larger aperture beam splitter or even a similarly large annular reflector instead of the smaller reflector 47 allows both the incident illumination and the detected scatter to be normal and/or near normal to the surface of the original. These latter field arrangements provide excellent features of high brightness and contrast from photographic media in particular but require the image to be magnified in order that the features be larger than typical sensor array elements. It does not work well on diffuse media.

Grazing angle illumination is accomplished using a prism 38 and a source 41 of illumination similar or identical to the prism and source of FIG. 5. Light from the source 41 is redirected at a first prism face and is then projected onto the original 14 at a grazing angle upon emission from the distal face which is at the surface. An image of the target zone of the original is formed at the navigation sensor 24.

While the invention has been described and illustrated as having a prism that includes surfaces having specified slopes, other configurations of prisms may be utilized to accomplish the desired grazing angle of illumination. In fact, a prism is not a critical element of the invention, since the grazing angle can be accomplished using other known optical elements, such as mirrors. Additional optical elements may also be employed for various purposes, such as trapping or baffling of stray light or to (1) improve the power distributions in beam cross sections, (2) define beam apertures, (3) block specularly reflected light and stray light, and/or (4) improve collimation in the planes where this is necessary to maintain a high contrast in the navigation images of the surface.

Figure 9:
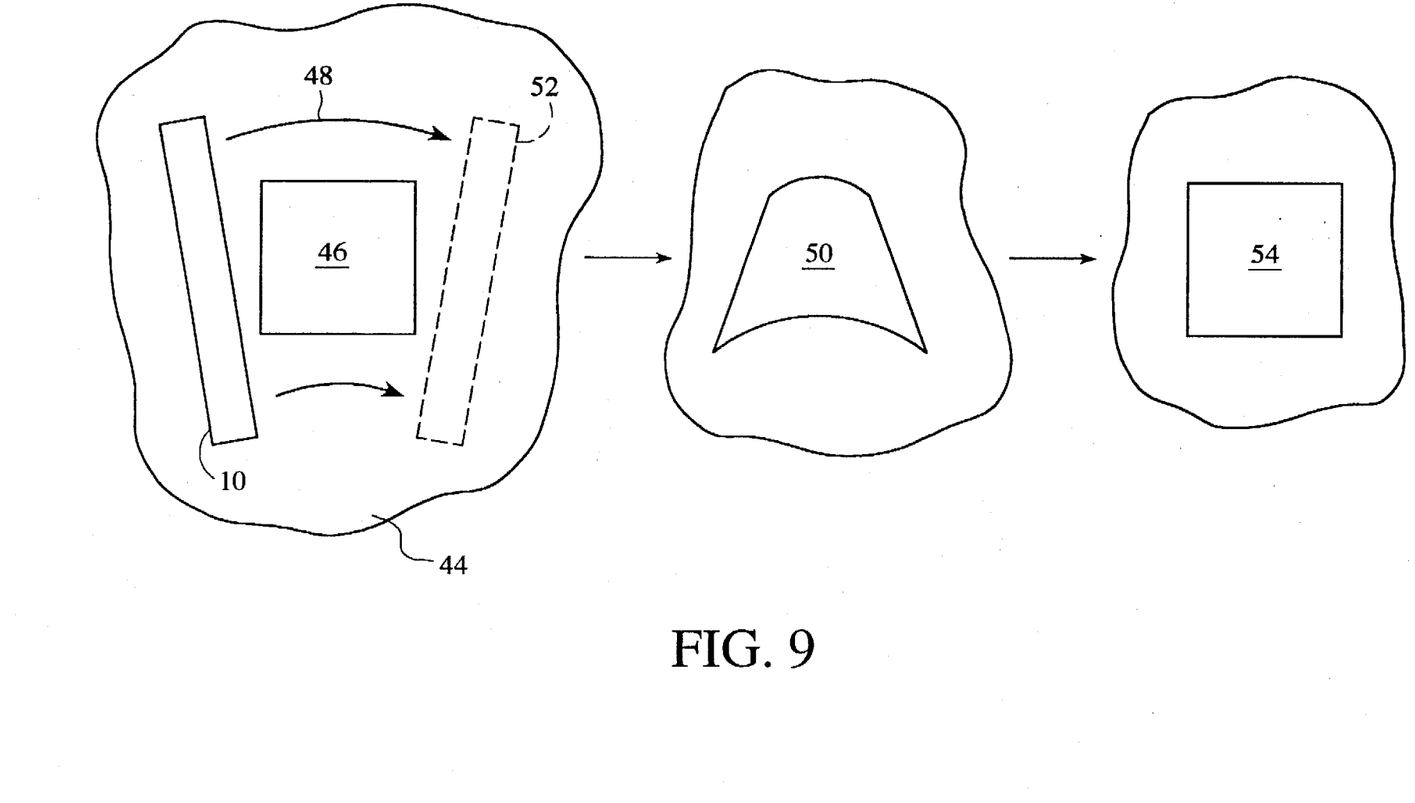
FIG. 9 is a conceptual view of the image capture operation of the scanning device of FIG. 1.

Referring now to FIG. 9, the scanner 10 is shown as being moved across an original 44 having a block 46 imprinted onto a surface of the original. Because the scanner 10 is not subjected to any kinematic constraints in the plane of the original, there is a tendency for a user to follow a curvilinear path across the original, as when the hand and forearm of the user rotate about the elbow. In FIG. 9, the scanning device is shown as following a curved path 48 across the block 46. If the lower edge of the scanning device is the edge that is closer to the elbow that defines the axis of rotation, the lower edge will have a shorter radius. Consequently, imaging elements of an imaging sensor will vary with respect to the time and distance required to pass over the block 46. A distorted image 50 of the block is captured as the device is moved to the second position 52, shown in dashed lines.

The captured image 50 would be the stored image in the absence of processing to be described below. However, as the imaging sensor captures data related to the block 46, navigation information is acquired. In the preferred embodiment, one or more navigation sensors capture data related to surface irregularities of the original 44. Movement of the surface irregularities relative to the scanning device 10 is tracked in order to determine displacement of the imaging sensor relative to the block 46. A faithful captured image 54 may then be formed. The image 54 is defined herein as the "rectified" image.

Figure 10:
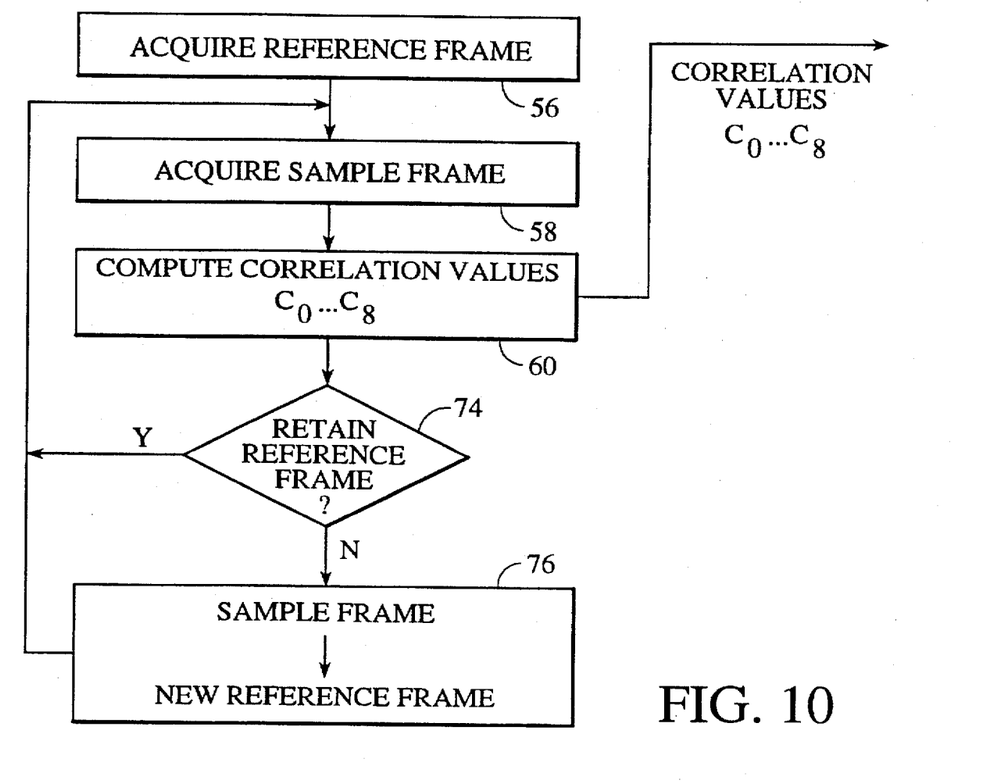
FIG. 10 is an operational view of one embodiment of the navigation processing of the scanning device of FIG. 1.

In FIG. 10, one embodiment of navigation processing is shown. The navigation processing is performed by correlating successive frames of navigation information, such as data representative of the illumination pattern formed by highly reflective raised surface features and the shadowed areas between raised surface features. The correlations compare the positions of the features in successive frames to provide information related to the position of a navigation sensor at a particular time. The navigation information is then used to rectify image data. The processing of FIG. 10 is typically performed for each navigation sensor.

In a first step 56, a reference frame is acquired. In effect, the reference frame is a start position. The position of a navigation sensor at a later time may be determined by acquiring 58 a sample frame of position data from the navigation sensor at the later time and then computing correlations 60 between the reference frame and the later-acquired sample frame.

Acquiring the initial reference frame 56 may take place upon initiation of the imaging process. For example, the acquisition may be triggered by mere placement of the scanning device into contact with the original. Alternatively, the scanning device may include a start button that initiates the image process and the navigation process. Initiation may also take place by a periodic pulsing of the illumination system of each navigator. If there is a reflected signal that exceeds a prescribed threshold of reflection or a correlation signal that indicates motion, the reference frame is then acquired.

While the navigation processing is performed computationally, the concepts of this embodiment may be described with reference to FIGS. 10 and 11. A reference frame 62 of the illumination pattern is shown as having an image of a T-shaped feature 64. The size of the reference frame depends upon factors such as the maximum scanning speed of the scanning device, the dominant spatial frequencies in the imaging of the structural features, and the image resolution of the sensor. A practical size of the reference frame for a navigation sensor that is thirty-two pixels (N) by sixty-four pixels (M) is 24×56 pixels.

At a later time (dt) a navigation sensor acquires a sample frame 66 of the illumination pattern which is displaced with respect to frame 62, but which shows substantially the same features, including the T-shaped feature 64. The duration dt is preferably set such that the relative displacement of the T-shaped feature 64 is less than one pixel of the navigation sensor at the velocity of translation of the scanning device. An acceptable time period is 50 μs for velocities of 0.45 meters/sec at 600 dpi.

If the scanning device has moved during the time period between acquiring 56 the reference frame 62 and acquiring 58 the sample frame 66, the first and second images of the T-shaped feature will be ones in which the feature has shifted. While the preferred embodiment is one in which dt is less than the time that allows a full-pixel movement, the schematic representation of FIG. 11 shows the feature 64 as having shifted upwardly and to the right by one pixel. The full-pixel shift is assumed only to simplify the representation.

Figure 11:
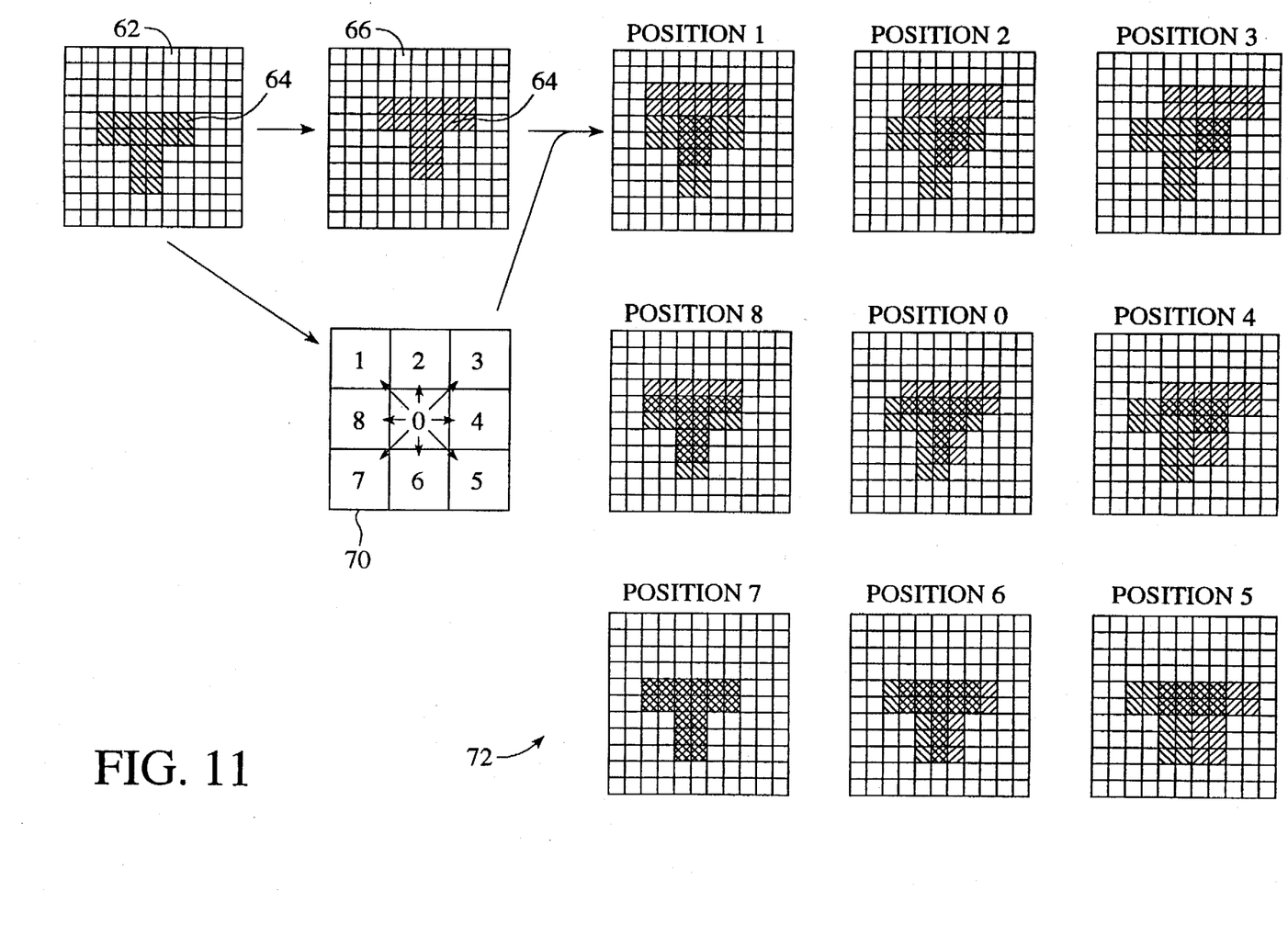
FIG. 11 is a schematic view of selected steps of FIG. 9.

Element 70 in FIG. 11 represents a sequential shifting of the pixel values of frame 66 into the eight nearest-neighbor pixels. That is, step "0" does not include a shift, step "1" is a diagonal shift upward and to the left, step "2" is an upward shift, etc. In this manner, the pixel-shifted frames can be combined with the sample frame 66 to produce the array 72 of position frames. The position frame designated as "Position 0" does not include a shift, so that the result is merely a combination of frames 62 and 66. "Position 7" has the minimum number of shaded pixels, and therefore is the frame with the highest correlation. Based upon the correlation results, the position of the T-shaped feature 64 in the sample frame 66 is determined to be a diagonal rightward and upward shift relative to the position of the same feature in earlier-acquired reference frame 62, which implies that the scanning device has moved leftwardly and downwardly during time dt.

While other correlation approaches may be employed, an acceptable approach is a "sum of the squared differences" correlation. For the embodiment of FIG. 11, there are nine correlation coefficients ($C_k=C_0, C_1 \ldots C_8$) formed from the nine offsets at element 70, with the correlation coefficients being determined by equation:

$$C_k = \sum_i \sum_j (S_{ij} - R_{(ij)+k})^2$$

where $S_{ij}$ denotes the navigation sensor-measured value at the position ij of the sample frame 66 and $R_{ij}$ denotes the navigation sensor-measured value at the frame 62 as shifted at the element 70 in the k direction, with k being the identifier of the shift at element 70. In FIG. 11, k=3 provides the correlation coefficient with the lowest value.

Correlations are used to find the locations of identical features in successive frames in order to determine the displacements of the features from frame-to-frame. Summing or integrating these displacements and correcting for scale factors introduced through the design of the relevant optics determine the displacements of the imaging sensor as a scanning procedure progresses.

After the correlation step 60 of FIG. 10 has been executed for a sample frame acquired at step 58, a determination is made as to whether to maintain or replace the reference frame. This is shown as step 74. If the same reference frame is to be used for subsequent correlation computation, the process returns to step 58 and a new sample frame is acquired. On the other hand, for applications in which there is to be a substitution of reference frames, step 76 shows the use of the previously acquired sample frame as a new reference frame prior to returning to step 58 to acquire a new sample frame.

While the process provides a high degree of correlation match, any errors that do occur will accumulate with each successive shift 76 of a sample frame 66 to the reference frame designation. In order to place a restriction on the growth rate of this "random walk" error, a sample frame is stored in a separate buffer memory. This separately stored sample frame becomes a new reference frame for a subsequent series of correlation computations. As an example, the new reference frame may be introduced after a fixed number of correlation computations.

The sampling period dt does not have to be constant. The sampling period may be determined as a function of previous measurements. One method that employs a variable dt is to improve the accuracy of displacement calculation by keeping the relative displacement between successive reference frames within certain bounds. For example, the upper bound may be one-pixel displacement, while the lower bound is determined by numerical roundoff considerations in the processing of the navigation data.

Referring again to FIG. 11, the T-shaped feature 64 may be a shadow that is cast by directing light from an illumination source at an angle of less than sixteen degrees relative to the surface of the original. On the other hand, the feature may be representative of a raised area on the surface, so that the area is highly reflective. That is, the feature may be a low intensity feature or a high intensity feature.

In one embodiment, the pixels of the reference frame 62 represent a field of view of 40 μm. The actual cross section of each sensor element of the navigation array is 60 μm. The optical elements of this embodiment provide a magnification of 150%. It should be noted in FIG. 9 that the detected feature 64 has a cross section of at least two fields of view. A 2:1 ratio of feature-to-field of view is dictated by Nyquist criteria. For use of the method and device in reproducing an image of the surface of the original, the high intensity and low intensity features may be a result of surface roughness formed by a screen in the manufacturing process of the paper. Typical cross sectional dimensions of paper fibers are in the range of 25 μm to 40 μm. Thus, tracking paper fibers is typically not desirable.

Projecting light at less than sixteen degrees relative to the surface of the original causes surface features that are typically not detectable to the human eye to cast shadows that provide an illumination pattern having sufficient depth of intensity modulation to allow tracking of features that satisfy the above-identified cross section requirement. Additionally, printed matter may be imaged, since the raised print will cast shadows when illuminated by light that is projected at an angle of less than sixteen degrees relative to the paper on which the print is located.

The direction in which light is projected relative to the direction of travel of the sensor array that is used to capture image-reproduction or position-encoding information is one major factor of the signal-to-noise ratio for the processing of the information. Another important factor is the number of sensor elements. The greater the number of sensor elements in the direction perpendicular to travel, the greater the number of high intensity and low intensity features that will be captured in each frame. Since the capture of features provides information of the tracking of the path of the sensor array, a greater number of sensor elements will increase the signal portion of the ratio. Thus, the "weakness" of the direction of illumination with respect to array travel perpendicular to the illumination direction can be offset by an increase in the number of sensor elements in that perpendicular direction. A third factor in the determination of the signal-to-noise ratio is DC removal. DC removal suppresses illumination characteristics that are common within a neighborhood of sensor elements. DC removal circuits transform an original frame 62 into an image of local differences. The local differences approach results in an image in which low spatial frequencies are removed, thereby facilitating correlations. DC removal is most easily carried out in a row-by-row fashion with local differences taken only along the rows during the transfer of pixel values in the frame along the rows of pixel values. If the removal of DC components is to be carried out in a row-by-row fashion, a column-by-column fashion, or both the selection of the fashion may be made in accordance with offsetting the weaknesses of one or both of the other important factors in determining the signal-to-noise ratio.

Figure 12:
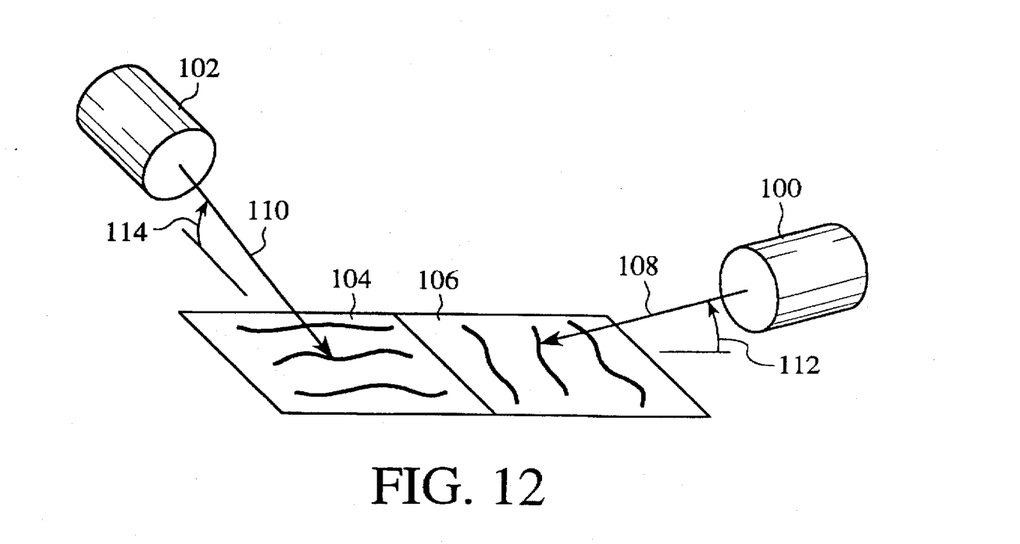
FIG. 12 is a schematic view of a cross-structured grazing angle illumination embodiment of the invention.

Thus, there are a number of ways of offsetting the correlation function asymmetry introduced as a function of the direction of relative movement between a sensor array and a surface of interest. FIG. 12 illustrates an embodiment for reducing the effects of this factor in the introduction of asymmetry. The embodiment of FIG. 12 illustrates cross-structured grazing illumination. In the preferred embodiment, a first source 100 of illumination is oriented generally along the direction of rows of sensor elements in the sensor array. A second illumination source 102 is oriented generally along the direction of the columns in the sensor array. The target region of a medium is divided into two regions 104 and 106, since each of the sources is positioned to illuminate only a portion of the total area to be imaged. Optionally, there is an overlap of the two regions. If each illuminated region 104 and 106 is approximately equal in size, e.g., 32×32 pixels, the entire sensor array may be 32×64 sensor elements. However, there is typically some overlapping as the illumination from one of the two sources "spills over" into the other region. The overlap does not seriously reduce the image contrast.

The sources 100 and 102 may be LEDs that generate beams 108 and 110 with narrow angles of divergence measured in their planes of incidence parallel to the surface normal. Each beam has an angle of incidence 112 and 114 that is less than sixteen degrees relative to the associated region 104 and 106 of the medium. Each region is simplistically shown as having three shadows that extend in directions generally perpendicular to the associated beam 108 and 110. The cross-structured illumination of FIG. 12 significantly reduces the correlation function asymmetry.

I claim:

1. A method of imaging topography of a surface of a medium comprising the steps of:
   providing illumination of said surface such that light strikes said surface at angles within sixteen degrees of said surface, including simultaneously directing said light from multiple planes of incidence, each being perpendicular to said surface, thereby forming an illumination pattern on at least a portion of said surface such that said illumination pattern has first areas of high brightness that correspond to raised surface features of said medium and has second areas of relatively low brightness; and
   forming data responsive to said first and second areas.

2. The method of claim 1 wherein said step that includes simultaneously directing said light from more than a single direction further includes providing multiple illumination sources operated to illuminate said portion of said surface from a plurality of different directions.

3. The method of claim 1 further comprising positioning a prism between said illumination sources and said surface for defining said angles within sixteen degrees.

4. A method of acquiring data related to topography of a medium comprising the steps of:
   providing a structure having an illumination source and an array of sensor elements in which each sensor element has a field of view;
   directing radiation from said illumination source at a surface of said medium such that said radiation defines a path that is fixed relative to said sensor elements, including establishing said path to be at an angle of less than sixteen degrees relative to said surface, thereby forming an illumination pattern on at least a portion of said surface such that said illumination pattern has first areas of relatively high brightness that correspond to raised surface features of said medium and has second areas of relatively low brightness;
   providing relative movement between said structure and said medium;
   during said step of providing relative movement and by means of said sensor elements, detecting said first areas of relatively high brightness and said second areas of relatively low brightness; and
   forming an image of said surface of said medium, including tracking positions of said first and second areas during said step of providing relative movement in order to determine at least one of position encoding information and image information.

5. The method of claim 4 wherein said step of directing radiation includes collimating radiation from an incoherent illumination source.

6. The method of claim 4 wherein said step of providing said structure having said illumination source and said array includes providing a two-dimensional array of sensor elements, said step of detecting said first and second areas being a step including positioning said array at or generally parallel and near to a conjugate image plane of said surface of said medium.

7. The method of claim 4 wherein said step of detecting said first and second areas is a step of forming successive images of primarily only those first and second areas having a dimension at least twice as large as a dimension of said field of view of each sensor element, said step of forming an image being one in which tracking of said first and second images in said successive images is employed to determine position encoding information.

8. The method of claim 7 wherein said step of forming an image further includes detecting print information on said surface in a manner independent from use of said sensor elements.

9. The method of claim 4 wherein said step of directing radiation includes attaching a prism to said structure to be within a first path from said illumination source to said medium and within a second path from said medium to said array of sensor elements.

10. The method of claim 9 further comprising directing a plurality of beams of light into said prism such that said prism redirects each beam to approach said surface at an angle of less than sixteen degrees from said surface.

11. A method of acquiring data related to topography of a surface comprising the steps of:
   providing a first illumination source and an array of sensor elements, each sensor element having a field of view;
   projecting radiation from said first illumination source onto a region of said surface having surface irregularities such that raised locations of said surface cast shadows among adjacent raised locations, thereby providing an illumination pattern having detectable contrast between high brightness pattern features corresponding to said raised locations and low brightness pattern features corresponding to locations adjacent to said raised locations, said step of projecting radiation including defining an angle of incidence of at least 74 degrees to the normal of said region of said surface;
   positioning said array of sensor elements to detect radiation intensity along said region of said surface;
   providing relative movement between said region and said first illumination source and said array, said relative movement being in a direction generally parallel to said surface; and
   using said array, imaging high and low intensity features having a cross sectional dimension at least twice as great as a cross sectional dimension of said field of view.

12. The method of claim 11 further comprising tracking raised locations of said surface, said tracking including a step of correlating successive illumination patterns during said step of providing relative movement.

13. The method of claim 11 wherein said step of projecting radiation includes positioning a prism between said surface and each of said first illumination and said array.

14. The method of claim 11 further comprising providing a second illumination source directed to project radiation onto a second region of said surface and within the fields of view of a portion of said sensor elements, wherein said sensor elements of said array are arranged in rows that are generally parallel to said projected radiation from said first illumination source and are arranged in columns that are generally parallel to said projected radiation from said second illumination source.

15. The method of claim 11 further comprising a step of forming an image signal representative of a printed image on said surface, said step of forming said image signal being carried out simultaneously with said step of imaging said features of said illumination pattern.

16. A device for acquiring data related to topography of a medium comprising:

a hand-manipulatable housing having a generally planar face for positioning in substantially parallel relationship with a surface of said medium;

an illumination source connected to said housing at said planar face;

an array of sensing elements positioned along said planar face; and optical means connected to said housing for directing light from said illumination source to reach said surface at an angle of less than sixteen degrees relative to said surface and for redirecting scattered light from said surface to impinge said sensing elements.

17. The device of claim 16 wherein said optical means includes a prism having a prism face that is distal to said housing and is substantially parallel to said planar face.

18. The device of claim 17 wherein said prism face is coated with a thin-film antireflective material.

19. The device of claim 17 wherein said illumination source includes a plurality of light sources directed to project light energy into said prism, said prism being configured to release said light energy from each of said light sources at an angle of less than sixteen degrees relative to said surface of said medium.

20. The device of claim 17 further comprising a second illumination means for projecting light into said prism to strike said surface of said medium at approximately the normal to said surface.

21. The device of claim 16 wherein said illumination means includes a source of incoherent light and a collimation lens.

22. The device of claim 16 wherein said hand-manipulatable housing is a scanner housing, said device further comprising an image sensor means for forming an image signal responsive to print on said surface of said medium.

23. The device of claim 16 wherein said array of sensing elements is a two-dimensional array.

* * * * *